(12) United States Patent
Ohara

(10) Patent No.: US 10,225,658 B2
(45) Date of Patent: Mar. 5, 2019

(54) ELASTIC COMPOSITE STRUCTURE FOR SPEAKER VIBRATING MEMBER

(71) Applicant: Hiroshi Ohara, Taoyuan (TW)

(72) Inventor: Hiroshi Ohara, Taoyuan (TW)

( * ) Notice: Subject to any disclaimer, the term of this patent is extended or adjusted under 35 U.S.C. 154(b) by 104 days.

(21) Appl. No.: 15/401,125

(22) Filed: Jan. 9, 2017

(65) Prior Publication Data

US 2018/0027331 A1 Jan. 25, 2018

(30) Foreign Application Priority Data

Jul. 21, 2016 (TW) .............................. 105211017 U

(51) Int. Cl.
| | |
|---|---|
| *H04R 7/14* | (2006.01) |
| *H04R 9/04* | (2006.01) |
| *H04R 31/00* | (2006.01) |
| *B32B 5/02* | (2006.01) |
| *H04R 7/26* | (2006.01) |

(52) U.S. Cl.
CPC ................. *H04R 7/14* (2013.01); *B32B 5/02* (2013.01); *H04R 7/26* (2013.01); *H04R 9/043* (2013.01); *H04R 31/00* (2013.01); *B32B 2457/00* (2013.01); *H04R 2307/029* (2013.01)

(58) Field of Classification Search
CPC ...... H04R 7/14; H04R 7/26; H04R 2307/029; B32B 5/02; B32B 2457/00
USPC ......................................... 181/167, 169, 173
See application file for complete search history.

(56) References Cited

U.S. PATENT DOCUMENTS

| | | | | |
|---|---|---|---|---|
| 5,031,720 A | * | 7/1991 | Ohta | H04R 7/02 181/169 |
| 5,329,072 A | * | 7/1994 | Kageyama | G10K 13/00 181/167 |
| 7,344,001 B2 | * | 3/2008 | Inoue | H04R 7/10 181/167 |
| 8,813,906 B2 | * | 8/2014 | Ohara | H04R 9/043 181/166 |
| 2010/0206659 A1 | * | 8/2010 | Funahashi | H04R 31/003 181/169 |
| 2013/0301867 A1 | * | 11/2013 | Jin | H04R 31/003 381/412 |

FOREIGN PATENT DOCUMENTS

JP         05168090 A  * 7/1993

* cited by examiner

*Primary Examiner* — Forrest M Phillips
(74) *Attorney, Agent, or Firm* — Lin & Associates Intellectual Property, Inc.

(57) ABSTRACT

An elastic composite structure for a speaker vibrating member, includes a vibrating member body, a resin base material and a gum material. The vibrating member body is provided with fibers that are interwoven with each other. The resin base material is coated over an outer side of the fibers for the fibers to keep a predetermined stiffness. The gum material is coated over and combined with the resin base material to form the elastic composite structure to maintain a predetermined resilience and ductility of the fibers. With such a structure, the resonance noise generated during the vibration of resin base material and speaker vibrating member may be reduced.

3 Claims, 6 Drawing Sheets

ELASTIC COMPOSITE STRUCTURE FOR SPEAKER VIBRATING MEMBER

CROSS-REFERENCE TO RELATED APPLICATION

This application claims the priority of Taiwanese patent application No. 105211017, filed on Jul. 21, 2016, which is incorporated herewith by reference.

BACKGROUND OF THE INVENTION

1. Field of the Invention

The present invention relates to a speaker vibrating member; more particularly, relates to an elastic composite structure of the speaker vibrating member.

2. The Prior Arts

Generally, many non-metallic components used in a speaker are made of fabric materials. The reason why fabric materials are commonly used in speakers is that the special treated fabric materials are able to provide proper resilience and strength that meets the function requirements of speakers. The non-metallic components may include vibrating members such as a drum paper, a damper and a connecting member. Dampers are considered as one of the most important components in a speaker. Not only can a damper determine the output power and audio characteristics of a speaker, it can also act as a basis of quality control during the manufacturing of a speaker.

One of a conventional ways to manufacture a speaker damper includes the following steps: an impregnating step, a drying step, a heat pressing step and a cutting step. The impregnating step involves impregnating the fiber cloth with a resin solution. Once the resin solution is absorbed by the fiber cloth, a resin layer is formed on an outer side of the fibers, and certain stiffness is provided to the fiber cloth. In the drying step, the fiber cloth absorbed with resin is dried so as to remove any water therein. Subsequently, the fiber cloth absorbed with resin is heated and pressed in the heat pressing step to form a wave-like shape in a cross section of the fiber cloth. Lastly, a central through hole is formed in the cutting step, and the fiber cloth is cut into multiple dampers. Extra fiber cloth is eliminated.

However, the damper manufactured from such a conventional method has the following drawbacks: a) the stiffness is the same throughout the whole damper; in addition, the dried resin has a poor resilience and can be overly stiff; b) after long term use, problems such as hardening, aging and rupture may occur to the damper due to vibration, fatigue stress and heat experienced by the resin; and, c) since resin and fiber cloth are two distinguishing materials, resonance noise between the vibrating frequencies of resin and fiber cloth is likely to occur, thereby causing problems such as increase in noises, low appearance of low frequency channels, poor resilience and poor sound quality; meanwhile, there are also possibilities for the damper to be damaged, deformed or fallen off.

Based on the above reasons, there is a need for the industry to develop a damper structure to overcome the abovementioned drawbacks.

SUMMARY OF THE INVENTION

A primary objective of the present invention is to provide an elastic composite structure for a speaker vibrating member. Resin base material and gum material are coated over an outer surface of the speaker vibrating member to form the elastic composite structure. In such a way, the speaker vibrating member is provided with a predetermined resilience and structural strength; in addition, the resonance noise generated by the resin base material and speaker vibrating member during vibration is also reduced.

In order to achieve the foregoing objects, the present invention provides an elastic composite structure for a speaker vibrating member, including: a vibrating member body, a resin base material and a gum material. The vibrating member body is provided with fibers that are interwoven with each other. The fibers arranged along a first linear direction are defined as warp threads, the fibers arranged along a second linear direction are defined as weft threads, and the first linear direction is perpendicular to the second linear direction. The resin base material is coated over an outer side of the fibers, so the fibers are able to keep a predetermined stiffness. The gum material is combined with the resin base material, and is coated over the outer side of the fibers to maintain a predetermined resilience and ductility of the fibers.

Preferably, the resin base material is coated over the outer side of the fibers to form a first cladding layer. The gum material is coated over the first cladding layer to form a second cladding layer which is combined with the first cladding layer formed by the resin base material over the outer side of the fibers.

Preferably, the resin base material is combined with the gum material to form a composite layer; in addition, the gum material is in a form of granules and is evenly distributed in the resin base material.

Preferably, the resin base material is selected from one of a synthetic resin, a natural resin or a combination thereof.

Preferably, the gum material is selected from a synthetic rubber, a natural rubber or a combination thereof.

In the elastic composite structure of speaker vibrating member provided by the present invention, combination of the gum material and the resin base material is coated over an outer side of the fibers by way of multiple impregnation. The resin base material serves to keep a predetermined stiffness of the fibers, and the gum materials serves to maintain a predetermined resilience and ductility of the fibers. By coating the resin base material and the gum material on the outer side of the speaker vibrating member, the elastic composite structure of the present invention is provided with a predetermined resilience and structural strength. In such a way, the resonance noise generated during the vibration of resin base material and speaker vibrating member may be reduced.

BRIEF DESCRIPTION OF THE DRAWINGS

Other purposes, advantages and innovative features of the present invention will be apparent to those skilled in the art by reading the following examples with reference to the appended drawings.

DETAILED DESCRIPTION OF THE PREFERRED EMBODIMENT

The accompanying drawings are included to provide a further understanding of the invention, and are incorporated in and constitute a part of this specification.

By impregnating fibers with resin and gum material for multiple times, the gum material may be effectively attached to or may effectively permeate the fibers in the present invention. In such a way, speaker vibrating members are provided with both structural strength and elasticity, and are able to reduce noise while vibrating. Multiple times of impregnations may be achieved by impregnating the fiber cloth with a mixture of the resin and the gum material in one single step, or, may be achieved by impregnating the fiber cloth with the resin and the gum material separately in different steps. Embodiments corresponding to the two approaches are described in the following sections.

Figure 1:
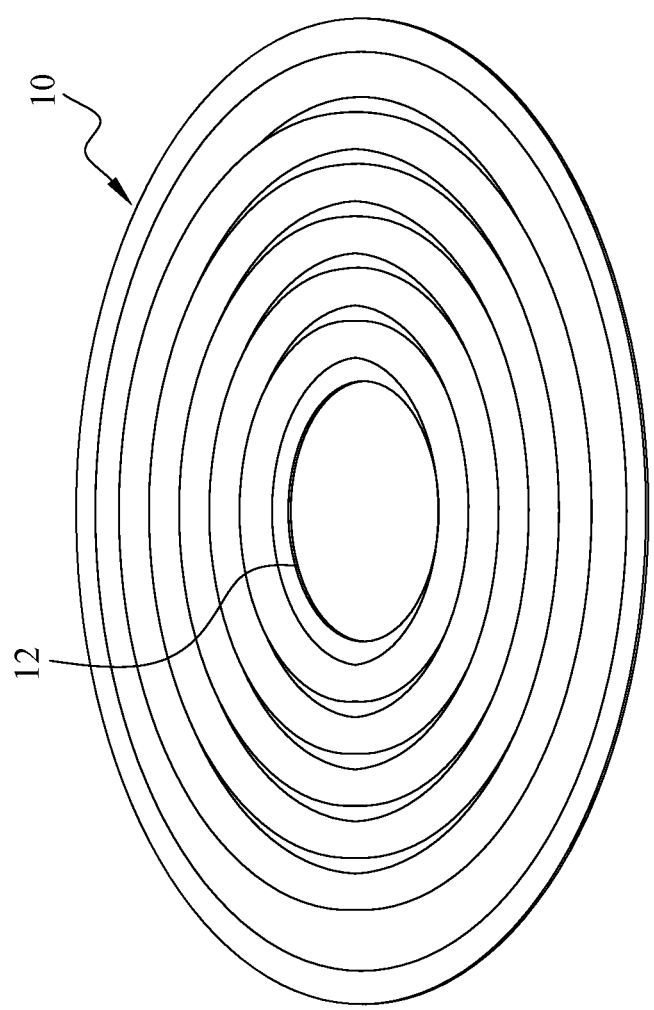
FIG. 1 is a perspective view illustrating a first embodiment of the present invention.
Figure 2:
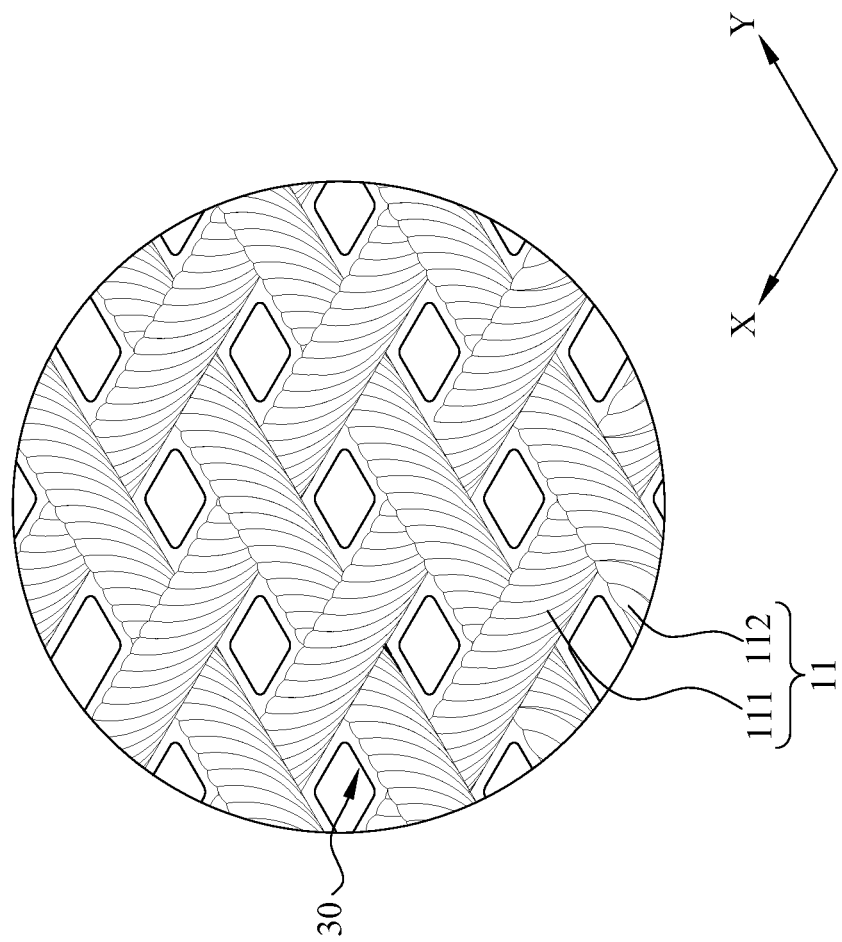
FIG. 2 is a partial enlarged view illustrating the first embodiment of the present invention.
Figure 3:
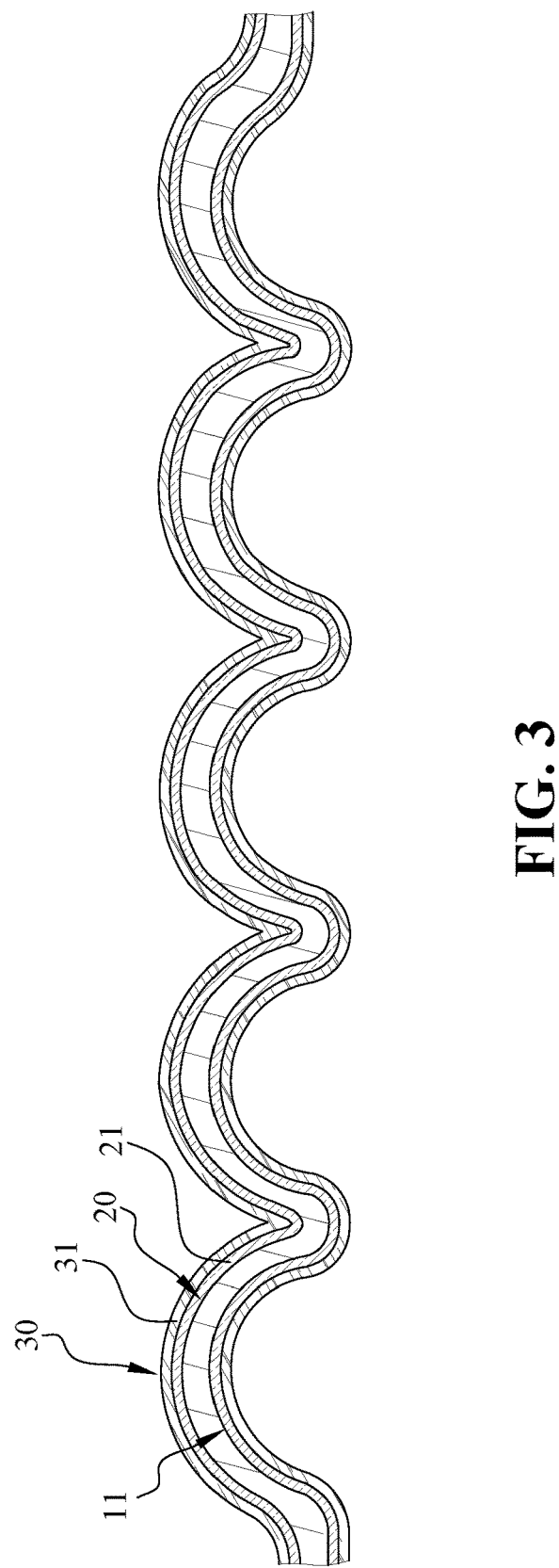
FIG. 3 is a sectional view illustrating the first embodiment of the present invention.
Figure 4:
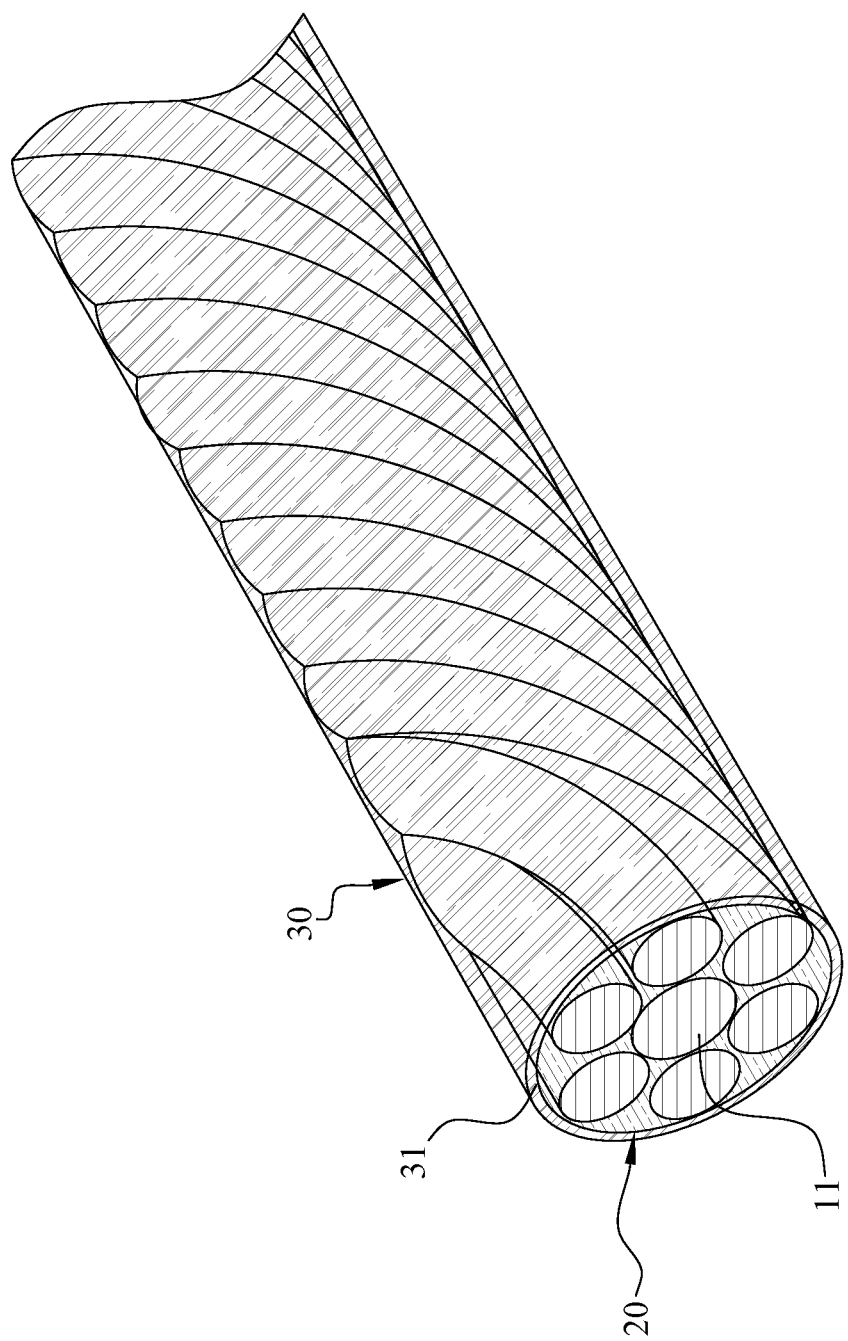
FIG. 4 is an enlarged perspective view illustrating the fiber according to the first embodiment of the present invention.

FIGS. 1-3 are the perspective view, partial enlarged view and sectional view illustrating the first embodiment of the present invention, respectively. FIG. 4 is an enlarged perspective view illustrating the fiber according to the first embodiment of the present invention. As shown in the figures, the present invention provides an elastic composite structure for speaker vibrating members, including a vibrating member body 10, a resin base material 20 and a gum material 30.

The vibrating member body 10 includes multiple fibers 11 that are interwoven with each other. Parts of the fibers 11 that are arranged along a first linear direction X are defined as the warp threads 111, and parts of the fiber 11 that are arranged along a second linear direction Y are defined as the weft threads 112. Herein, the first linear direction X is perpendicular to the second linear direction Y. In the first embodiment of the present invention, the vibrating member body 10 has a circular disc shape, and the cross section of the vibrating member body 10 has a wavy shape. In addition, a through hole 12 is provided at a center of the vibrating member body 10 for connecting a voice coil (not shown in the figures).

The resin base material 20 is coated on an outer side of the fibers 11. The purpose of the resin base material 20 is to maintain a predetermined stiffness of the fibers 11. Herein, the resin may be selected from a synthetic resin, a natural resin or a combination thereof. In the first embodiment of the present invention, the synthetic resin is selected as the resin base material 20.

The gum material 30 is combined with the resin base material 20, and is coated on the outer side of the fibers 11. The purpose of the gum material 30 is to maintain a predetermined resilience and ductility of the fibers 11. Herein, the gum material 30 may be selected from a synthetic rubber, a natural rubber or a combination thereof. In the first embodiment of the present invention, the synthetic rubber is selected as the gum material 30.

Further, as shown in FIGS. 3 and 4, the resin base material 20 in the first embodiment is coated over the outer side of the fibers 11 to form a first cladding layer 21. The gum material 30 herein is coated over the first cladding layer 21 to form a second cladding layer 31 which is combined with the first cladding layer 21 formed by the resin base material 20 over the outer side of the fibers 11. Meanwhile, the second cladding layer 31 is coated over the first cladding layer 21 so as to form the elastic composite structure of the present invention.

In order for those skilled in the art to further understand the structure, technical features and technical effects of the present invention, the usage of the present invention will be explained hereafter. The present invention should be further understood after reading the following section.

FIG. 3 is the sectional view illustrating the first embodiment of the present invention. FIG. 4 is an enlarged perspective view illustrating a fiber of the first embodiment. The present invention is characterized in that the combination of the gum material 30 and the resin base material 20 is coated over the outer side of the fibers 11. Meanwhile, the resin base material 20 serves to maintain a predetermined stiffness of the fibers 11, and the gum material 30 serves to maintain a predetermined resilience and ductility of the fibers 11.

By coating the resin base material 20 and the gum material 30 over the outer surface of the speaker vibrating member via separate impregnation processes, the elastic composite structure of the present invention is formed, and the speaker vibrating member is provided with predetermined resilience and structural strength. As a result, resonance noise generated during the vibration of resin base material 20 and speaker vibrating member may be reduced.

Figure 5:
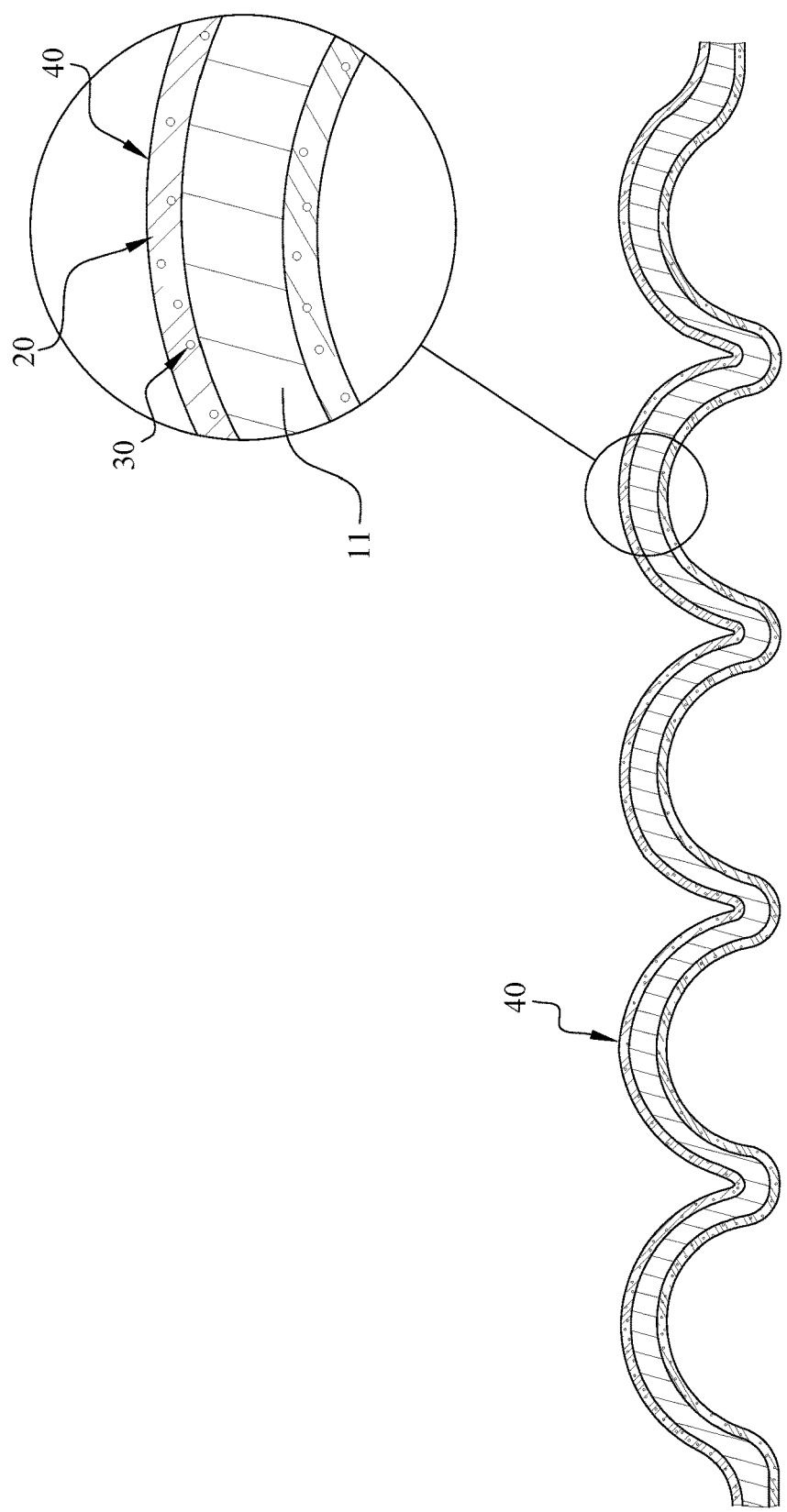
FIG. 5 is a sectional view illustrating a second embodiment of the present invention.
Figure 6:
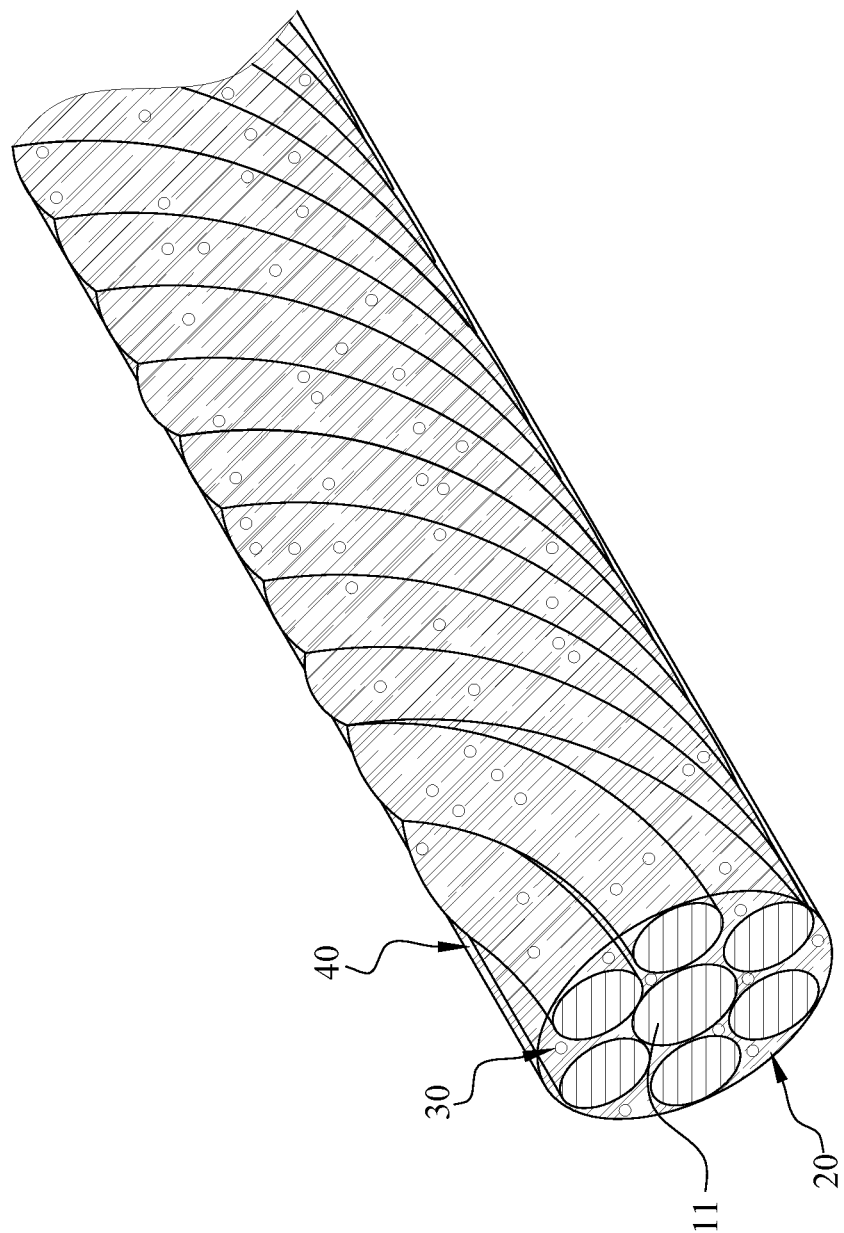
FIG. 6 is an enlarged perspective view illustrating the fiber according to the second embodiment of the present invention.

FIG. 5 is a sectional view illustrating a second embodiment of the present invention. FIG. 6 is an enlarged perspective view illustrating the fiber 11 according to the second embodiment of the present invention. In contrast to the first embodiment, the second embodiment of the present invention is different in that the fibers are impregnated with the mixture of resin and gum material in a single step, so a composite layer 40 is formed by the combination of resin base material 20 and gum material 30. In addition, the gum material 30 is in the form of granules and is evenly distributed in the resin. Herein, the composite layer 40 is coated over the outer side of the fibers 11 so as to form the elastic composite structure of the present invention. With the abovementioned features, the second embodiment of the present invention is capable of achieving the same effects as the first embodiment of the present invention.

It is worth mentioning that with the elasticity provided by the gum material 30, the vibrating member body 10 of the present invention is able to further soften the speaker vibrating member to increase its ductility and fatigue resistance. Not only may the resonance noise generated by the resin base material be reduced, but problems such as rupture, deformation or aging of the outer surface of the vibrating member body 10 may also be reduced. Hence, the present invention is able to provide a vibrating member body 10 with a prolonged lifetime, and is also able to provide a better speaker sound quality.

In short, the technical features and advantageous effects of the present invention are summarized as follows:

In the elastic composite structure of speaker vibrating members provided by the present invention, the combination of the gum material 30 and the resin base material 20 is coated over the outer side of the fibers 11. Meanwhile, the resin base material 20 serves to maintain a predetermined stiffness of the fibers 11, and the gum material 30 serves to maintain a predetermined resilience and ductility of the fibers 11. By coating the resin base material 20 and the gum material 30 over the outer surface of the speaker vibrating member, the elastic composite structure of the present invention is formed. With the elasticity provided by the gum material 30, the elastic composite structure of the present invention is able to further soften the speaker vibrating member to increase its ductility and fatigue resistance. As a result, the speaker vibrating member is provided with predetermined resilience and structural strength, and the resonance noise generated during the vibration of resin base material 20 and speaker vibrating member may be reduced.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An elastic composite structure for a speaker vibrating member, comprising:
    a vibrating member body having a plurality of fibers that are interwoven with each other, wherein the fibers arranged along a first linear direction are defined as warp threads, the fibers arranged along a second linear direction are defined as weft threads, and the first linear direction is perpendicular to the second linear direction;
    a resin base material coated over an outer side of the fibers to form a first cladding layer, wherein the resin base material enables the fibers to maintain a predetermined stiffness; and
    a gum material coated over the first cladding layer to form a second cladding layer, wherein the first cladding layer in combination with the second cladding layer is coated over the outer side of the fibers for maintaining a predetermined resilience and ductility of the fibers;
    wherein the fibers are coated by the elastic composite structure formed by the first cladding layer and the second cladding layer with the second cladding layer coated over the first cladding layer.

2. The elastic composite structure according to claim 1, wherein the resin base material is selected from one of a synthetic resin, a natural resin or a combination thereof.

3. The elastic composite structure according to claim 1, wherein the gum material is selected from a synthetic rubber, a natural rubber or a combination thereof.

\* \* \* \* \*